United States Patent [19]

Gerpheide et al.

[11] Patent Number: 4,563,739

[45] Date of Patent: Jan. 7, 1986

[54] INVENTORY AND BUSINESS MANAGEMENT SYSTEM WHICH ACCOUNTS FOR THE CONTENTS OF FULL AND PARTIALLY FILLED PRODUCT CONTAINERS

[75] Inventors: George E. Gerpheide, Salt Lake City, Utah; B. Craig Anderson; Linda Hill, both of Whitefish, Mont.

[73] Assignee: Impulse Computer Systems, Inc., Billings, Mont.

[21] Appl. No.: 515,079

[22] Filed: Jul. 18, 1983

[51] Int. Cl.[4] .............................. G06F 15/24
[52] U.S. Cl. ................... 364/403; 364/466; 177/25; 235/385; 235/462
[58] Field of Search ................ 364/400–401, 364/403–404, 464–466, 556, 558, 567–568; 235/383, 385, 462–463; 177/1–5, 25

[56] References Cited

U.S. PATENT DOCUMENTS

| | | | |
|---|---|---|---|
| 2,279,375 | 4/1942 | Manning | 265/27 |
| 2,936,163 | 5/1960 | Foster | 265/27 |
| 3,737,631 | 6/1973 | Harris | 235/61.6 R |
| 3,863,724 | 2/1975 | Dalia, Jr. | 177/25 |
| 3,958,102 | 5/1976 | Burt | 235/61.6 R |
| 4,025,766 | 5/1977 | Ng et al. | 364/403 X |
| 4,176,260 | 11/1979 | Ward et al. | 235/475 |
| 4,180,204 | 12/1979 | Koenig et al. | 235/385 |
| 4,237,536 | 12/1980 | Enelow et al. | 364/465 |
| 4,373,133 | 2/1983 | Clyne et al. | 235/383 |
| 4,419,734 | 12/1983 | Wolfson et al. | 364/567 |

Primary Examiner—Jerry Smith
Assistant Examiner—Gary V. Harkcom
Attorney, Agent, or Firm—John R. Ley

[57] ABSTRACT

A computer based system is used for taking inventory and obtaining inventory reports on numerous products which are dispensed in full containers or in quantities from partially filled containers. Each container includes a unique code identifying the product therein. A code sensor such as a bar code reading wand supplies signals to the computer identifying the product. A weighing device supplies signals to the computer indicative of the weight of partially filled containers. Inventory information is obtained by sensing the code of full containers and entering the number of full containers present at a dispensing station or stockroom station within the business operation. The quantity of product in partially filled containers is obtained by sensing the code, obtaining particular product information from the computer memory on the product identified by the code, and using the weight signal from the weighing device. Informational reports created by the computer relate to each particular product dispensed or to the product types which are categories of different products dispensed. The information may be obtained from the business operation as a whole or with respect to any particular selected station.

19 Claims, 9 Drawing Figures

Fig_1

Fig_3

Fig_4

Fig_5

Fig_6

Fig_7

Fig_8

Fig_9

INVENTORY AND BUSINESS MANAGEMENT SYSTEM WHICH ACCOUNTS FOR THE CONTENTS OF FULL AND PARTIALLY FILLED PRODUCT CONTAINERS

This invention pertains to a system for use in taking an inventory, obtaining business management information, and maintaining control over the inventory when the inventory consists of products dispensed in full and partially full containers. The system of the present invention is particularly useful when the products are beverages dispensed by the drink from larger containers of the beverage. Bars, restaurants, entertainment clubs and other alcoholic beverage dispensing operations are the primary intended applications, although the system has utility in a variety of situations where products are sold and dispensed, particularly where the products are identified by codes such as conventional bar codes and when partial contents of containerized products are sold and dispensed.

BACKGROUND OF THE INVENTION

Effective control of liquor stock has traditionally been the major problem and concern for owners of establishments which dispense liquors and other types of beverages. A lack of adequate information to insure a consistent stock of liquor as it is dispensed has been one aspect of this problem. Employee responsibility is another aspect. As a result, the potential for a successful liquor dispensing operation has been diminished in the past because of the lack of appropriate informational capabilities to maintain effective control.

Partial attempts at supplying solutions to some of the problems involved in effective control of liquor dispensing establishments have been made in the past. These attempts have only been directed toward partial solutions to the more complex problems of effective overall inventory control. For example, it is known to weigh partially filled beverage containers for the purpose of determining the quantity which has been dispensed over a particular time period. Such measurement arrangements do not address the larger inventory control problem of accounting for all of the bottles or containers, whether they are unused or whether they are partially filled as a result of use. Such weighing devices do not provide the comprehensive inventory and stock control information necessary for effective management and profitable operation of the establishment.

Elaborate systems for controlling the dispensing of beverages have also been devised. In general, these systems require each of the beverages to be dispensed through a machine. By dispensing liquor through the machine, information pertaining to the number of dispensed quantities, the hours of dispensation, and the actual fact of dispensation can all be measured or controlled. Such systems are more in the nature of control systems, rather than systems capable of providing the inventory, management and financial information important in managing a successful business operation.

In the sales of consumer items, it is also known to apply particular types of optical codes to each product and utilize an electronic device for sensing the code to access information particular to the product sold. Such information is used for a variety of different purposes, including inventorying and inventory control. Such arrangements have been primarily contemplated for use in retail vending operations wherein complete containers of products are sold, not where partial contents of products are dispensed from containers. Furthermore, an employee of the seller usually directly accounts for all of the items selected by the consumer at the time the consumer pays for the items, for example the check-out personnel in a grocery market, thereby significantly reducing the possibility for errors in correlating sales of the products with the number of products dispensed from the inventory. While such systems may be useful for deriving information pertaining to the number of whole items sold, such systems are not particularly useful in deriving whole or complete inventory or management information, including, for example, the inventory remaining on-hand or that inventory added or subtracted from the existing stock or that information necessary to correlate dispensed products to sold products when no direct employee accounting for this relationship always exists.

Inventory taking systems for warehouses and the like are also known, wherein each particular item in the warehouse contains some type of an inventory label which may be detected. Such systems are, however, not directly concerned with retail or point of purchase sales or dispensing partial contents from containers of products.

SUMMARY OF THE INVENTION

In accordance with its broad aspects, the present invention provides a system for obtaining inventory and financial reports regarding a business operation wherein products are dispensed in full containers and in predetermined quantities less than the full amount from the containers. The present invention is particularly useful in establishments or business operations engaged in dispensing alcoholic and other types of beverages. The information is available from the reports on a per product basis; or on a per station basis where a station is defined as a location or area containing its own inventory of products and where the products are dispensed or the products are stored, such as a central stock supply or stockroom; and on a product type basis where the information for different product types, for example liquor, gun-dispensed beverages, wine, beer, or miscellaneous beverages, is summarized with respect to each or every particular station and/or with respect to the whole business operation. The information provided is comprehensive and not only allows the management of the business establishment to fully control its inventory, but also provides the management with business management and financial information, thereby increasing the possibility that the business operation will become and remain profitable.

The system of the present invention includes means for identifying each particular product dispensed by sensing a code, such as a conventional bar code, attached to the container. A weighing scale or cell is also provided for weighing containers which are partially filled with the product. A computer is included within the system and the computer includes product record information concerning each particular product dispensed. A conventional wand bar code reader is moved across the code on the container and signals are supplied to the computer by which the particular product in the container is identified. Signals from the weighing cell or device are also received by the computer. By correlating the weight signals with the product identification signals and utilizing the product record information in the computer memory, the quantity of product remaining in partially filled containers is automatically calculated. The number of completely full containers of particular products is also supplied to the computer by the user entering the number of full containers which the user counts and by using the wand bar code reader to identify these particular products. The computer calculates the quantity of product in the full and partially filled containers and that quantity is recorded as inventory data within the computer memory. Current on-hand and previously on-hand inventory data is maintained in the computer memory and is updated with each subsequent inventory.

The system also includes a provision for entering information describing the volume of sales or products. The costs of each particular item can be included within the product record information. The sales and cost information is also utilized by the computer in creating the inventory reports. A variety of different inventory reports are available with respect to the business operation as a whole or with respect to each particular station or with respect to the product type activities from any selected station or the business operation as a whole.

Preferably, the system of the present invention is enclosed within a carrying case, thereby allowing it to be readily transported from one station to another to conveniently conduct the inventory at each different station. Thereafter, the apparatus may be removed to a different location and operatively connected with a printer so that the inventory reports can be supplied in printed form.

The nature and details of the present invention can be more completely understood by reference to the following description of a preferred embodiment, taken in conjunction with the drawings, and from the appended claims.

DRAWINGS

FIG. 8 is also representative of the "Stock Items" operation of the flow diagram shown in FIG. 4.

DETAILED DESCRIPTION OF THE PREFERRED EMBODIMENT

Figure 1:
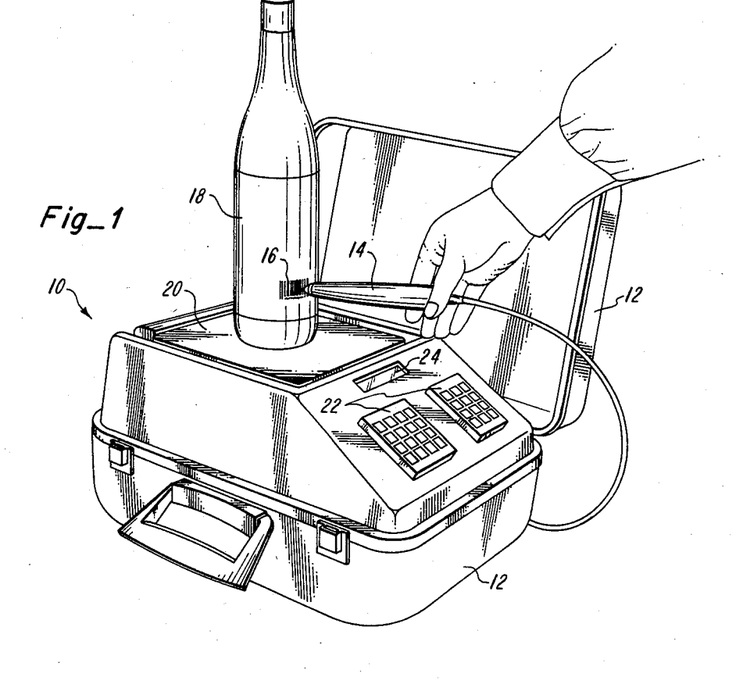
FIG. 1 is a perspective view of apparatus embodying the system of the present invention.

The system of the present invention is embodied in an apparatus 10 shown in FIG. 1. The apparatus 10 includes a conventional hinged carrying case 12 so that it can be conveniently transported from one location or station to the other during use. The apparatus 10 also includes a conventional bar code reader or wand 14 for reading or sensing the commercial bar code 16 contained on containers such as a liquor bottle 18. As is known, the bar code sets forth information used to uniquely identify the product within the container and also the quantity of product within the container. If the liquor bottle 18, or any other container with which the present invention may be used, does not have a commercial bar code 16, special code tags will be supplied for use in association with such containers. By moving the wand 14 over the bar code 16, a unique product identification signal corresponding to the bar code is derived which identifies the particular product and its quantity in bottle 18.

The apparatus 10 also includes a conventional weighing device or weigh cell 20 with a weigh pan upon which partially filled containers or bottles 18 are weighed. The signals from the weigh cell 20 are employed for the purpose of determining the quantity of product remaining in each bottle 18 after a part of the contents has been dispensed therefrom.

The apparatus 10 also includes at least one keyboard 22 which is used to control the operation of the system of the apparatus 10 and to manually enter information into the system, as is described below. A conventional display 24 is also included for displaying information entered at the keyboard 22 or derived by use of the apparatus 10 and the system.

Figure 2:
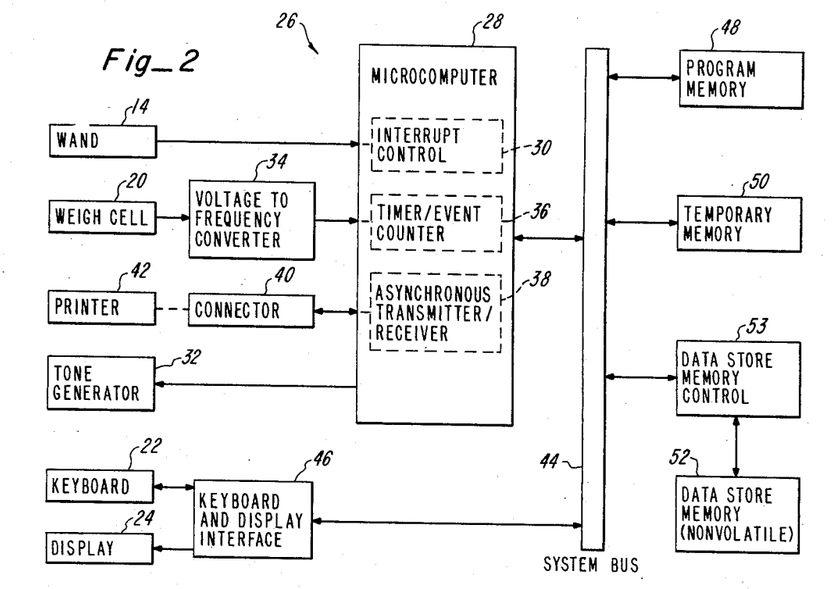
FIG. 2 is a block diagram of the system of the present invention which is incorporated within the apparatus shown in FIG. 1.

The system of the apparatus 10 is shown in FIG. 2, wherein it is referenced 26. The heart of the system 26 is a microprocessor-based microcomputer 28 which serves as means for controlling the operation of the system 26 to create the inventory, financial and management information reports hereafter described.

The wand 14 is operatively connected to a conventional interrupt control 30 of the computer 28. Signals from the wand 14 are received by the computer 28 and product identification signals corresponding to the bar code are created by the computer 28. The technique for deriving the product identification signals is well known. The wand 14 supplies signals to the interrupt control 30 when it optically senses transitions between the black bars and white stripes of the bar code 16 (FIG. 1) as the wand is moved over the bar code. The width of the black bars and white stripes of the defines the unique code for each product. It is assumed that the wand 14 is moved across the bar code 16 (FIG. 1) at a substantially uniform rate. The interval between sequential transition signals is timed. The time intervals between wand transition signals are used to derive a relationship of the width of the bars and stripes on the bar code, and the product identification signal is derived from this relationship.

The product identification signal derived from the wand transition signals is compared by the computer 28 to other product identification information which has previously been entered into the computer memory as a part of a product record. As will be discussed, a product record contains information specifying each particular product and its container which is currently available to be dispensed or which exists within the inventory of the business establishment. Upon detection of a product identification signal for which there exists a product record, the computer 28 delivers a signal to a tone generator 32. The tone generator 32 creates an audible tone indicating acknowledgment of the receipt of a valid product identification signal. For product identification signals for which no product record exists, the computer 28 will signal the tone generator 32 to supply a different audible signal. In this manner, the user is assured of the proper use of the wand 14 in detecting the bar code 16.

The weigh cell 20 is a commercially available item which supplies an analog signal as an output signal related to the weight on a weigh pan of the cell 20. In the system 26, the weight-related analog signal from the weigh cell 20 is supplied to a voltage to frequency converter 34. The voltage to frequency converter 34 supplies a pulsating output signal wherein the frequency of the pulses is directly related to the input analog voltage. A weight-related frequency signal is thereby derived and supplied to a conventional timer/event counter 36 of the computer 28.

In order for the computer 28 to derive a weight signal representative of the weight measured by the weigh cell 20, the timer/event counter 36 is controlled by the computer 28 to count the number of pulses of the weight-related frequency signal during a predetermined time period. The counted number of pulses represents and is used to derive the weight signal corresponding to the weight measured by the weigh cell 20. After the weight signal is derived, the computer 28 delivers a signal to the tone generator 32, and an audible tone is delivered to indicate that weighing has been completed.

A conventional asynchronous transmitter/receiver 38 of the computer 28 is controlled to deliver data in a serial fashion to a conventional connector 40 or to serially receive data therefrom. The operation of the asynchronous transmitter/receiver 38 and its control by the computer 28 to achieve serial data transfer is well known. The connector 40 may be the well known RS232 connector. The connector 40 is used for the purpose of connecting a printer 42 to the system 26, or may be used to connect other well known computer equipment. The printer 42 serves as means for producing copies of the inventory report information. Preferably the connector 40 is located on the exterior of the carrying case 12 of the apparatus 10, although it is not shown in FIG. 1.

A system bus 44 extends from the computer 28 for the purpose of connecting the other elements of the system 26. An interface device 46 is connected to the system bus 44, and it is through the interface 46 that the keyboard 22 and the display 24 are operatively connected to the computer 28. The keyboard 22 is of a known configuration employing rows and columns of keys. Each key is interrogated on a row and column basis and signals indicative of the depressed keys are supplied to the computer 28 through the interface 46. The display 24 is a conventional alpha numeric liquid crystal display. Signals supplied by the computer 28 through the interface 46 are received by the display and the information corresponding to the signals is visually presented.

A program memory 48 is also connected to the system bus 44. The program memory 48 is a typical electrically programmable read-only memory EPROM which permanently contains the operating program for the computer 28, including the necessary information for causing the computer to create the inventory reports as hereafter described. A temporary memory 50 comprises a quantity of random access memory (RAM). The temporary memory 50 is a temporary buffer memory used somewhat similarly to a scratch pad for the purpose of holding intermediate data and providing a storage location for calculations conducted during the inventory and when deriving inventory reports. After an inventory is completed, the inventory data contained within the temporary memory 50 is transferred to a data store memory 52.

The data store memory 52 is connected to the system bus 44 through a conventional data store memory interface or control 53. The data store memory 52 consists of electrically erasable and programmable read only memory (EEPROM) or another type of nonvolatile memory. In order to record the inventory data supplied to the data store memory, a special voltage source of the data store memory control 53 is controlled by signals supplied by the computer 28 over the system bus. Upon receiving the inventory data and programming control signals, the inventory data is programmed into the EEPROM of the data store memory 52. Permanent inventory data is thus obtained and maintained in the data store memory. EEPROM or some other type of programmable nonvolatile memory is employed so that the inventory data stored in the data store memory 52 will remain available even when the electrical power to the system 26 is disconnected, such as when the apparatus is transported from one location of use to another.

Figure 3:
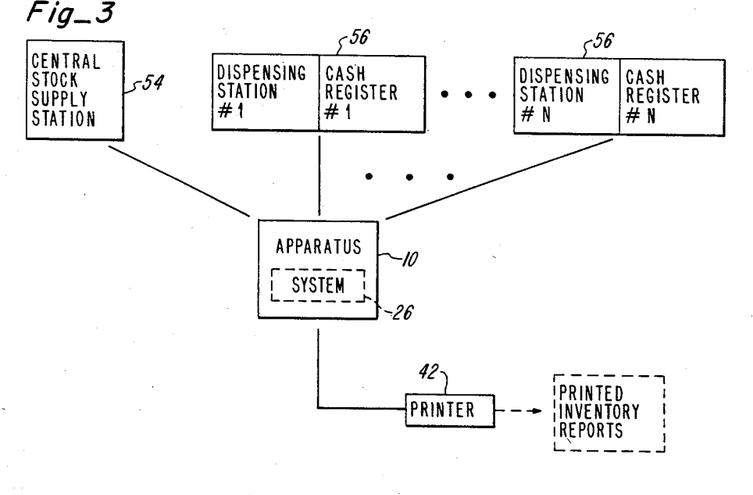
FIG. 3 is a block diagram generally illustrating the use of the apparatus and system shown in FIGS. 1 and 2 in a typical liquor dispensing operation.

An understanding of the manner in which the apparatus 10 and system 26 are physically employed in conducting an inventory and obtaining inventory, financial and business management information is illustrated in FIG. 3. FIG. 3 illustrates the typical business operation of a beverage dispensing establishment. A central stock supply station 54 is provided to hold the stock or supply of various different beverage products to be dispensed. At least one dispensing station 56, but possibly a plurality of dispensing stations up to a number N, may be provided. Each dispensing station is a physically separate area or location having its own identifiable and separate stock of beverage products to be dispensed. Each dispensing station 56 may additionally include its own cash register, upon which sales are recorded. The dispensing stations could, in reality, be separate establishments, so long as each of those establishments is supplied from a central stock supply station 54 or from central stock inventory.

A product record containing information specifying each and every particular beverage product dispensed and the type or category within which the beverage is classified is present in the data store memory 52 of system 26, or a new product record will be created as each new beverage product is received at the central stock supply 54. In the central stock supply station 54, an inventory is taken of the numbers of the different beverage products. The particular products are identified by use of the wand 14 (FIGS. 1 and 2) or by entering a number associated with the code or a reference number assigned to the product, and the number of containers of each identified product is entered at the keyboard 22 (FIGS. 1 and 2). This inventory data is permanently recorded in the data store memory 52 of the system 26. After the inventory in the central stock supply station 54 is completed, the apparatus 10 is physically taken to each dispensing station 56 where similar inventory data is also obtained by use of the wand and keyboard for full containers of identified beverage products. In addition, inventory data pertaining to the amount of contents remaining in partially filled bottles or containers at each station 56 is also obtained by use of the weigh cell 20 and the wand 14 (FIGS. 1 and 2), as will be described in greater detail. The amount of gun-dispensed beverages is obtained from the meter on the dispensing machine and entered at the keyboard. Sales information pertaining to the amount and type of sales of beverages dispensed from the station 56 is collected and will be entered into the computer memory of the system 26 by use of the keyboard. The sales information is obtained from the cash register receipts. Once the inventory data from a station 56 is obtained, it is transferred to the data store memory 52 before the next subsequent inventory at the next station 56 is commenced.

After all of the inventory data and sales information has been collected from the various stations 54 and 56, the system is now in condition to supply inventory reports. From commands from the user entered at the keyboard 22 (FIGS. 1 and 2), the operating program will control the system computer to create various inventory reports based on the inventory data and sales information. The information may be displayed at the display 24 (FIGS. 1 and 2) or may be printed. The apparatus 10 is physically moved to the location of the printer 42, and the printer 42 is connected to the system 26 through the connector 40 (FIGS. 1 and 2) to obtain the printed inventory reports. Usually, the sales information will be entered into the computer memory at the time the inventory reports are to be created.

Inventory reports are selectively supplied with respect to each particular beverage product dispensed and/or each particular beverage type dispensed as to any selected station and/or as a summary of all of the stations. The product type information for alcoholic beverages is liquor, wine, beer, and gun-distributed liquors. Exemplary of the specific inventory and financial information available from each inventory report with respect to each product and each type of product is the amount and wholesale cost of stock added, the amount and wholesale cost of current stock, the amount and wholesale cost of stock used, the amount and wholesale cost of previous stock, the calculated gross profit, the calculated and actual (cash register) gross sales, sales differential information which is the calculated gross sales less the actual gross sales, cost percentage information which is the wholesale cost of the stock used divided by the calculated gross sales, actual cost percentage information which is the wholesale cost of the stock used divided by the actual gross sales, cost percentage differential information which is the actual cost percentage less the cost percentage, product type percentage of total sales information which is the total amount of sales of each type of beverage divided by the calculated gross sales, and actual percentage of total sales information which is the total calculated sales of each type of liquor divided by the total actual sales. Of course, other types of accounting and inventory information can also be derived by programming the computer of the system to follow the known accounting and inventory functions to derive this information.

The functions of the system 26 and operations of the computer 28 (FIG. 2) are understood by reference to the flow diagrams shown in FIGS. 4 to 9. In the description of the flow diagrams, reference numbers are used to identify particular operations shown in the flow diagrams.

Figure 4:
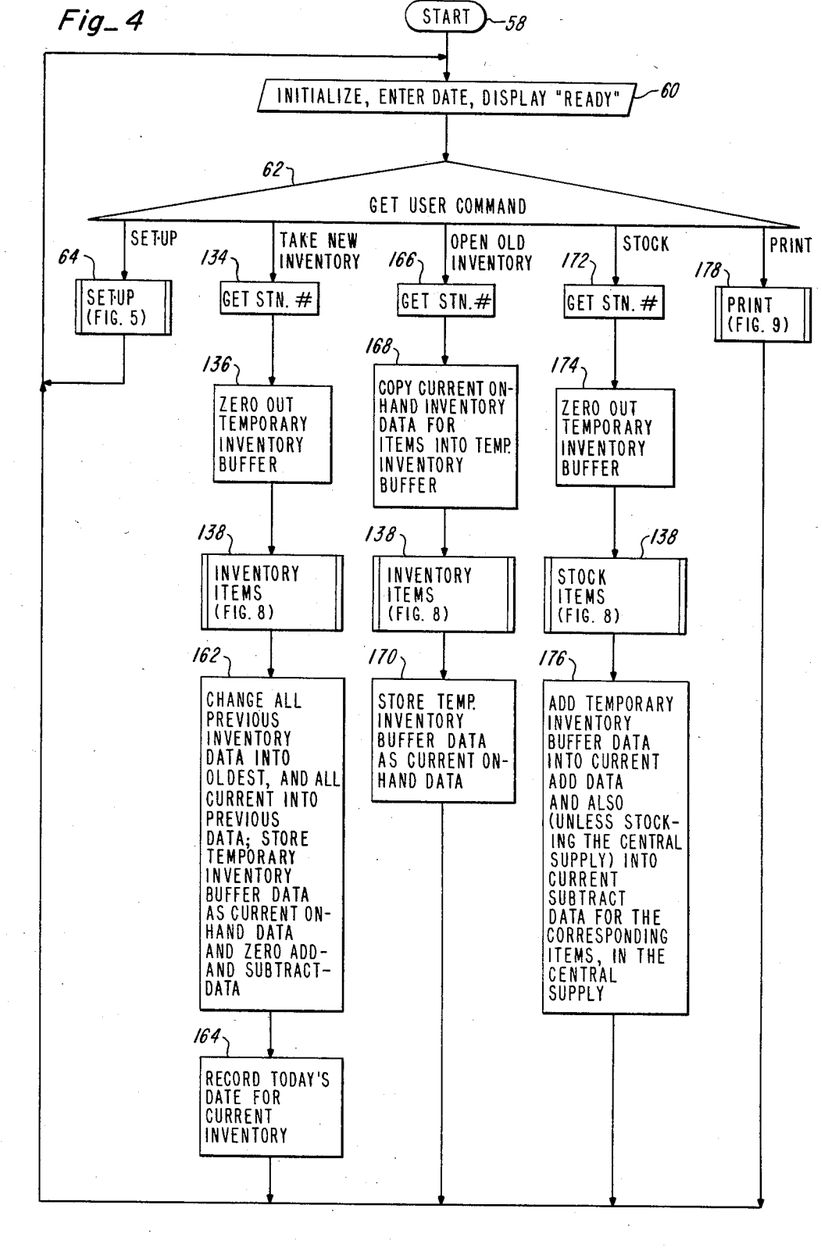
FIG. 4 is a general flow diagram of the operation of the present system and a computer of the system shown in FIG. 2.

The overall system operations and computer functions are understood from FIG. 4. Operation is commenced at 58 by connecting the system to electrical power. Preferably, a key operated switch (not shown) is provided for this purpose and for the purpose of limiting access to the system to those authorized to use it. The system is initialized and the present date is entered at 60. The word "Ready" is displayed on the display 24 (FIGS. 1 and 2). The user then enters a command at 62 on the keyboard indicative of the type of use to which the system is to be put. One exemplary use is "Set-Up", which generally pertains to entering information identifying the dispensing stations and stockroom and creating product records for each product dispensed and creating item records for each product dispensed at each particular station. A "Take New Inventory" command generally pertains to taking an inventory at the central stock supply or at a dispensing station. The command to "Open Old Inventory" generally pertains to completing a new inventory which has been interrupted. In other words, the partially completed inventory is considered to be the old inventory and it is accessed to complete the inventory. The command to "Stock" pertains to transferring stock between different dispensing stations and/or to or from the central supply. The "Stock" command is used to add to amounts in inventory or subtract from amounts in inventory, and in many regards is similar to the "Take New Inventory" command. The command to "Print" is simply to print out the inventory reports which have been derived from the inventory data and sales information. Each of these user commands is described below in greater detail.

Figure 5:
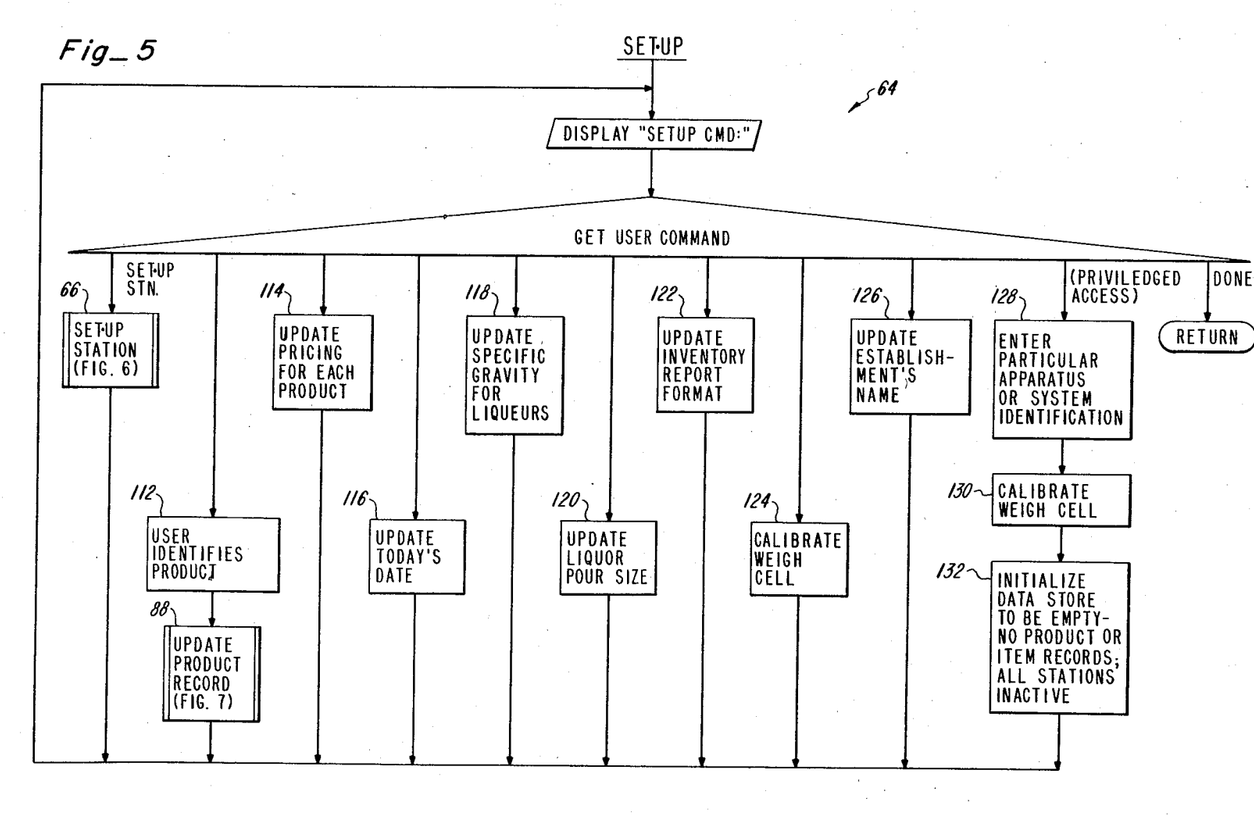
FIG. 5 is a flow diagram of the "Set-Up" operation of the flow diagram shown in FIG. 4.

The "Set-Up" function illustrated at 64 in FIG. 4 is shown in detail in FIG. 5. After selecting the set-up command, "Set-Up Command—" is displayed. Thereafter, the user will select and enter a number signifying one of the different commands illustrated in FIG. 5. One command selected at 66, "Set-Up Station", pertains to setting up a dispensing station or central stock supply, and is illustrated in greater detail in FIG. 6.

Figure 6:
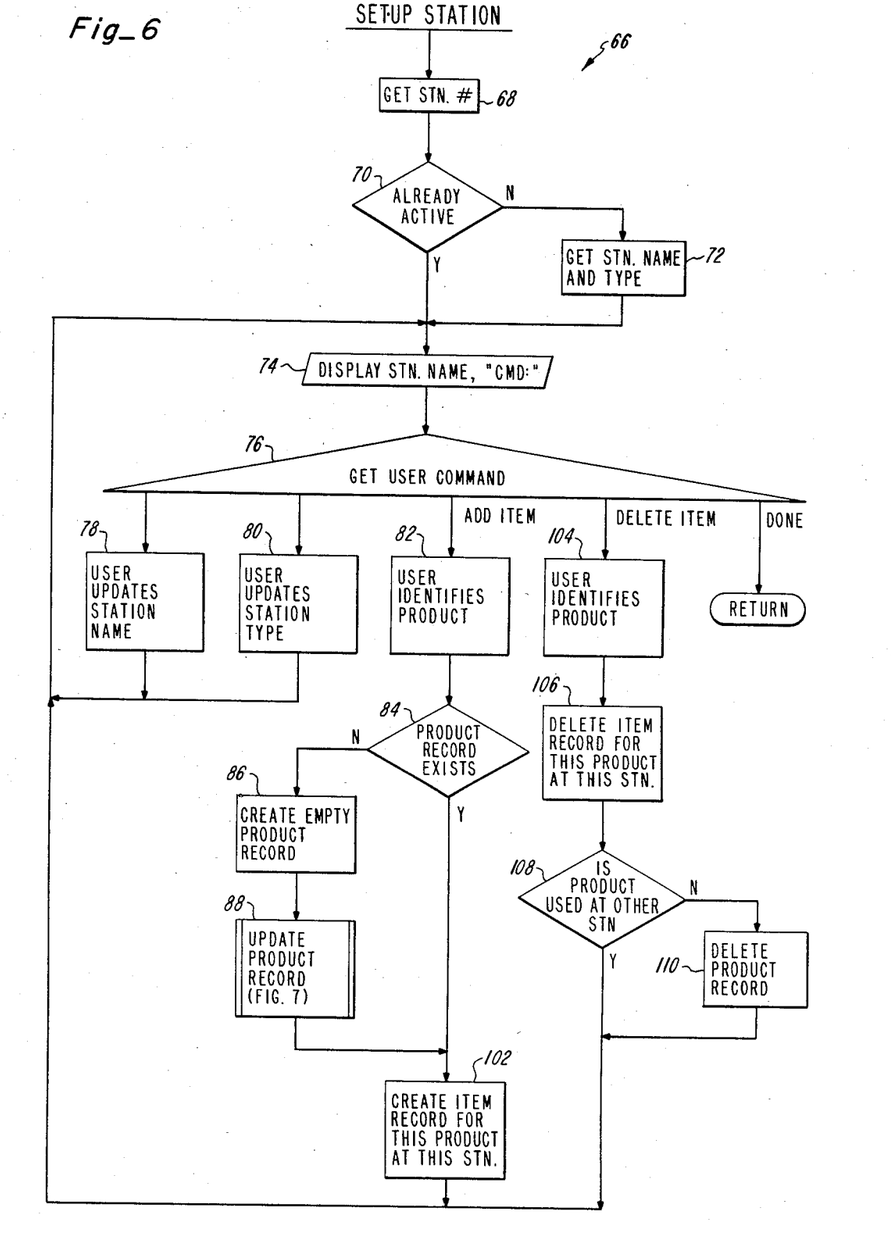
FIG. 6 is a flow diagram of the "Set-Up Station" operation of the flow diagram shown in FIG. 5.

As shown in FIG. 6, the "Set-Up Station" function proceeds by the user entering the number of the dispensing station or the central stock supply, at 68. In the operating system, the central stock supply is not operationally distinguished from a dispensing station, except that each dispensing station and the central stock supply are distinguished from one another by unique numbers and information assigned to each. A determination is made if the station is active at 70. If not, the user must enter the station name and the station type, i.e., bar, stockroom, or package dispensing station. Once this information is entered at 72, a request for a command is displayed at 74 and the user enters one of a number of commands. One command allows the user to update or change the station name as shown at 78. Another command at 80 allows the user to update or change the designation of the type of station.

To add an item record designating a particular new product to be dispensed from or located at the selected dispensing station, the user identifies the new product at 82. The new product is specified by moving the wand 14 (FIGS. 1 and 2) over the bar code 16 (FIG. 1) or by manually entering the number associated with the bar code at the keyboard 22 (FIGS. 1 and 2). This step of adding a new item at the selected station must initially be accomplished with each item initially dispensed from a new station, and is thereafter repeated only for each additional new item to be dispensed from that station. After the product has been identified at 82, a determination is made if a product record exists for that product anywhere within the computer memory for the establishment.

Initially, of course, no product record will exist for a new product which has not been previously present at any station. It is therefore necessary to create an empty product record at 86 for each new product. The product record information is updated or actually created for new products at 88. The steps in creating a product record at 88 are better illustrated in FIG. 7. Once a product record has been created, that record is available to supply information about that product regardless of the station product is present.

Figure 7:
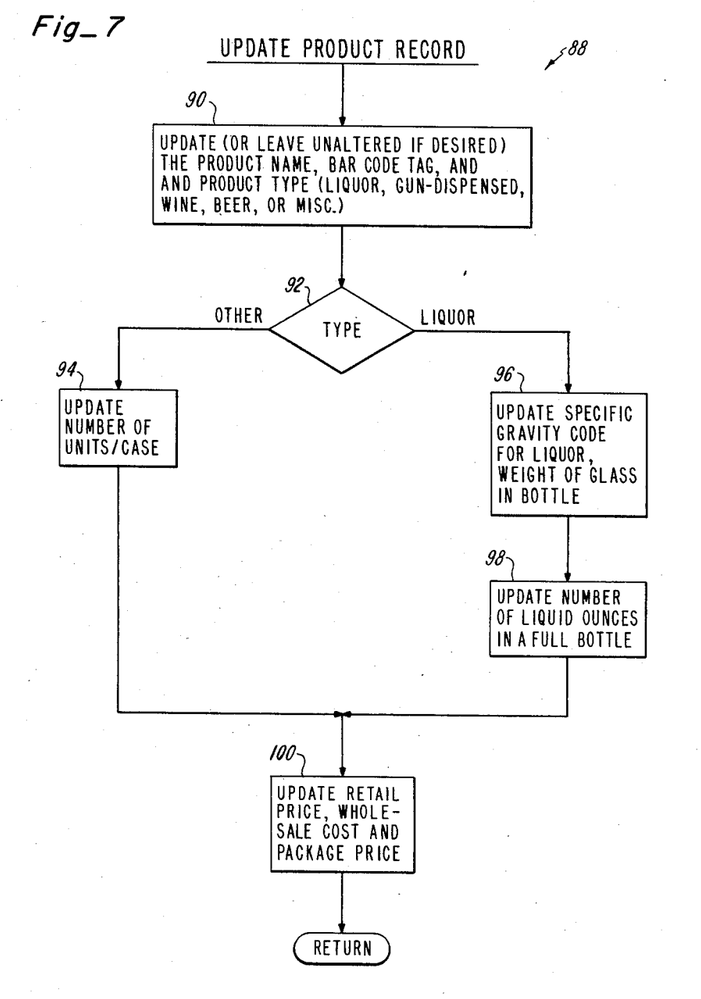
FIG. 7 is a flow diagram of the "Up-Date Product Record" operation shown in the flow diagram of FIG. 6.

As shown in FIG. 7, the user updates, or enters if the product is new, information pertaining to the product name, the bar code, and the product type (liquor, gun-dispensed beverage, wine, beer, or other miscellaneous type) at 90. A determination is made at 92 if the product is a liquor or some other type. If the product is of some other type, then information is entered or updated as to the number of units of that product in a case, as shown at 94. For liquors, a substantial amount of information is entered with respect to each product, as shown at 96. The specific gravity of each particular product of the liquor type is entered. Although most liquor products have approximately the same specific gravity, liqueurs can vary substantially. The specific gravity information can be obtained by a hydrometer, or may be previously determined and supplied in the form of an informational chart. The weight of the glass in the bottle containing each product is also entered or updated. The weight of the bottle glass could be from a supplied informational chart, or can be derived by weighing a full bottle and subtracting the liquid weight obtained from the specific gravity information and the size of the container, or by weighing an empty bottle. The number of liquid ounces in a full bottle is entered or updated at 98. The information entered at 96 is used for relating the weight of a partially filled container to the fluid quantity remaining in the container, by subtracting the bottle glass weight and dividing the result by the specific gravity of the particular product identified. Lastly, the user updates or enters information pertaining to the resale price, wholesale cost and package price, as shown at 100.

In this manner, the product record containing information particular to each product in inventory in the establishment is updated or created as shown at 88 in FIG. 7. Returning from the operation of updating the product record 88 to FIG. 6, an item record is created at 102 for each particular product for which a product record exists for the station selected at 68. The item record is particular to the station selected at 68 and designates those products which are in inventory in the selected station.

Of course, if a product record already exists in data store memory 52 of the system 26 (FIG. 2), by reason of it having been earlier created during an inventory at a previous station, only an item record is created at 102 for the particular station selected at 68.

When setting up a particular station, the user may also select a command at 104 to delete a particular item record designating a particular product which will no longer be present at the selected station. To delete an item record, the user identifies the particular product at 104 which is to be deleted. Identification of the particular product occurs in the same manner as has previously been described at 82, i.e., by moving the wand over the bar code or entering the code number. Thereafter, the product item record is deleted with respect to this particular dispensing station at 106. A determination is made at 108 whether the particular deleted product is present at any other station in the system. If so, no further action is taken, but if not, the product record is deleted from the computer memory for the whole system, as illustrated at 110.

In the foregoing description of the "Set-Up Station" operation 66 shown in FIG. 6, after each of the various commands selected at 78, 80, 82 and 104, the program will return so that another command can be selected, if desired. Once the station is set up properly, the user can select a command "Done" to cause a return to the exit "Set-Up" operation 64 shown in FIG. 4.

It has been shown that the "Set-Up Station" operation 66, which has been described in conjunction with FIGS. 6 and 7, is employed to enter into the data store memory 52 (FIG. 2), product records for each particular product dispensed or in inventory, item records for each particular product present at each particular station, and the name, type and status information with respect to each particular station.

In addition to the "Set-Up Station" operation 66 shown in FIG. 5, the product information may be updated as shown at 112 and at 88. Updating the product information entails obtaining a product identification for a particular product as shown at 112. The product identification is created by moving the wand over the bar code or by manually entering the code number associated with the product from the keyboard. Once the product identification is obtained, it is retained in memory and is used to determine if a bar code has been properly sensed from the bottles during the use. After identifying the product at 112, the product record will be updated at 88, as has been previously been described in FIG. 7.

Another set-up command pertains to updating the retail and wholesale price information for each product as shown at 114, updating the current date as shown at 116, updating the density or specific gravity for liquors as shown at 118, updating the size of each liquor pour or serving size dispensed as shown at 120. Updating the information shown at 114, 116, 118 and 120 entails entering the new information from the keyboard.

Other set-up commands include updating the format or type of inventory report information which may be displayed or printed in reports, as shown at 122. The inventory report information format has been previously programmed into the program memory 46 (FIG. 2) and can be selected by the user through entries on the keyboard.

The user may also calibrate the weigh cell as shown in 124. Calibrating the weigh cell involves weighing with no weight on the weigh cell and obtaining a displayed weight reading from the system, and placing a weight of predetermined magnitude on the weigh cell and obtaining a particular displayed weight from the system under these conditions. Adjustments to the no-weight and the predetermined weight readings are thereafter made through entries at the keyboard. A program operation, not described in greater detail, adjusts the no-weight and predetermined weight readings as entered, and thereafter adjusts all other measured weights in proportion to the linear curve between the no-weight and predetermined weight conditions.

The user may further update the name of the establishment or business in which the apparatus and system is used, as shown at 126. The name of the establishment is presented on the inventory reports.

Lastly, a privileged user command is provided for the purpose of allowing information to be entered when the system and apparatus is manufactured or when it is serviced by authorized personnel. Authorized personnel can enter information pertaining to the identification of particular apparatus, e.g., serial number and date of manufacture, as shown at 128, and initially calibrate the weigh cell as shown at 130. In addition the data store memory 52 (FIG.2) is initially cleared during manufacturing or after servicing so that it contains no product or item records and all stations are indicated as inactive, as shown at 132.

After any one of the set-up commands is selected, it is possible to select another set-up command, since each particular operation returns to the point where it is possible to select another command. However, once the set-up commands have been selected to the satisfaction of the user, the set-up operation returns to the operation shown at 60 in FIG. 4. It is appreciated that after the set-up operation has been fully effected, product and item records have been created or updated, station information has been entered, pricing information has been entered, specific gravity has been entered, the pour size of beverages has been entered, the weigh cell has been calibrated, and the name of the establishment and the present date have been entered. In short, the system is ready to take new inventory, open old inventory, or record stock transferrals, or print information. These are the other commands which may be selected at 62 as illustrated in FIG. 4.

To take new inventory, as shown in FIG. 4, the station number is first entered at 134. Thereafter the system zeros or clears a temporary inventory buffer or memory location within the temporary memory 50 (FIG. 2), as shown at 136. The temporary inventory buffer will be used to retain inventory data until it is transferred to the data store memory 52 (FIG. 2). Thereafter the items are inventoried at 138, and the "Inventory Items" operation is shown in detail in FIG. 8.

Figure 8:
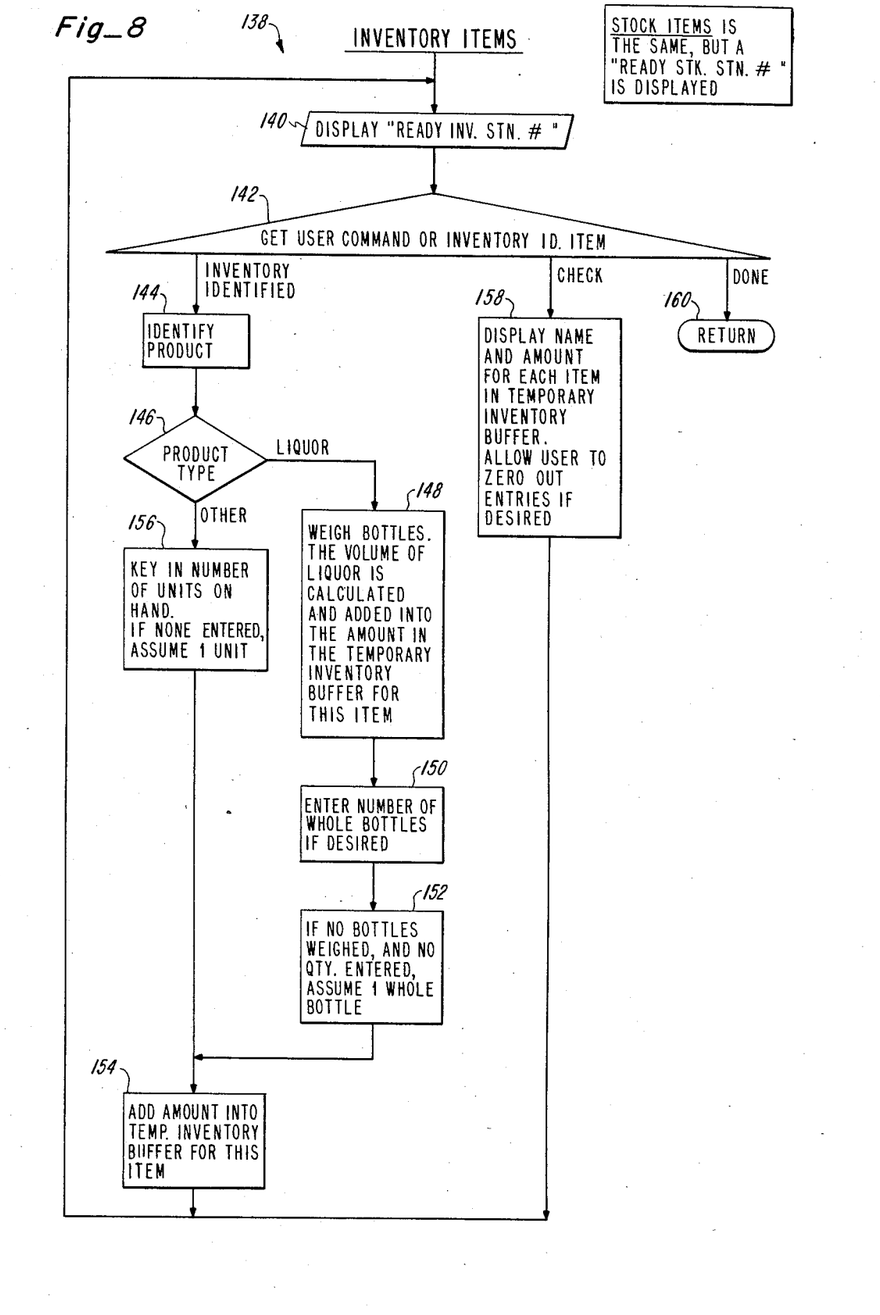
FIG. 8 is a flow diagram of the "Inventory Items" operation of the flow diagram shown in FIG. 4.

In the "Inventory Items" operation at 138, shown in FIG. 8, there is initially displayed "Ready Inventory Station Number___" where the station number has been selected at 132 (FIG. 4). The user can thereafter select an "Inventory Identified Item", a "Check" or a "Done" operation, by entering the appropriate command at the keyboard.

To perform the "Inventory Identified Item" operation, the product is first identified at 144 by moving the wand over the bar code of the bottle, or by entering an appropriate code number at the keyboard. A determination is made at 146 as to the product type. For liquors, all of the partially filled bottles at the station will be weighed. The volume of contents in each partially filled container is calculated using the measured total weight, the glass bottle weight, and the specific gravity. The volume of liquor is recorded into the temporary inventory buffer memory. All of this is shown at 148. The number of whole unused bottles of the identified product are entered at the keyboard, as shown at 150. For those fully filled bottles, there is no need to weigh those bottles and the user can simply enter the number of those unused bottles. If no bottles are weighed and no quantity of filled bottles is entered at the keyboard, the system assumes one completely filled bottle of the identified product has been inventoried as shown at 152. The total amount of liquor from fully and partially filled bottles is added into the temporary memory associated with the particular item record.

If a product type other than liquor is determined at 146, the user enters the number of units of that particular product present at the dispensing station, as shown at 156. The number of units present will be the number of full containers, and for gun-dispensed beverages will be the metered number of servings. Meters associated with gun-dispensers provide indications of the number of unit servings, and this number is entered from the keyboard. If no number is entered at the keyboard, the system assumes that one unit of the particular type of product has been entered. This is shown at 156. Since only liquor is dispensed by the drink and other types of beverages are dispensed by the container-full, or by gun-dispensed units, there are no partially filled containers to be weighed at 156. Thereafter the total amount of other types of products are added into the temporary memory associated with those types of products on the item record, as shown at 154. After completion of the operative step 154, the system will return to and allow access, if desired, to the "Check" command at 142.

Upon commanding a "Check" operation, the system will display the name and quantity of each product for which there is inventory data recorded in the temporary inventory buffer associated with the item record, as shown at 158. This provides a method to check the inventory which the user has just conducted. Should an error be detected in the inventory data displayed at 158, the user can clear the data in the memory associated with each particular product for which there is an error, as is also shown at 158. Thereafter the system will return to allow corrections in the inventory data by allowing the user to proceed with the item specification operation just described for the particular product.

Once the items have been satisfactorily inventoried at 138, the operation returns, as shown at 160, to the flow diagram illustrated in FIG. 4. All the previous inventory data recorded into the data store memory is changed to the oldest status, and all current inventory data is changed into the previous status, and the inventory data from the temporary inventory memory is transferred to the data store memory and is designated as current on-hand inventory data. In addition, all memory locations employed for the purpose of noting additions to and subtractions from inventory are cleared. These functions are illustrated at 162. Thereafter the system records the current date for use in designating the current on-hand inventory, as shown at 164. Three inventory data records are maintained for each particular product at each station, as shown at 162. These inventory data records are the oldest, previous, and current on-hand inventory data. Each is associated with the date when the inventory was taken. The current on-hand and previous inventory data records are used in creating the inventory reports. The oldest inventory data record is maintained primarily as a back-up source of information. After accomplishing the operation at 164, the system will return and allow the user to select, for example, the "Open Old Inventory" command.

The "Open Old Inventory" command will typically be selected for completing an inventory which was interrupted. The interrupted inventory data which had been completed will have previously been recorded in the data store memory as under the current on-hand inventory as was illustrated at 162. Since this data is incomplete, it is necessary to retrieve that data and add to it that additional inventory data necessary to complete the inventory. This is accomplished by initially entering the station number as shown at 166. The system retrieves the current on-hand inventory data for all products at this particular station and transfers them to the temporary inventory buffer memory, as shown at 168. Thereafter the uninventoried products are added to the inventory by following the "Inventory Items" operations 138 previously describing conjunction with FIG. 8. Only those products at that station which have not previously been inventoried will be inventoried. After the inventory of products has been completed the data in the temporary inventory buffer memory is transferred to the data store memory and is designated as current on-hand status as shown in 170. The previous inventory data and old inventory data will remain unchanged because that data has previously been changed as shown at 162 upon transfer of the incomplete inventory data into the data store memory as the current on-hand inventory data. The system will then return to allow the user to select, for example, the "Stock" command.

The "Stock" command is employed primarily to account for stocking of products at a station. The "Stock" command proceeds by entering the particular station number, as shown at 172. The temporary inventory buffer memory locations are temporarily cleared, as shown in 174. Thereafter the operation of "Stock Items" is carried out at the selected station by operations exactly the same as "Inventory Items" at 138, with the exception that, with reference to FIG. 8, the notation "Ready Stock Station Number—" is displayed instead of "Ready Inventory Station Number—" as shown at 140. The inventory data from the "Stock Item" operation is recorded into the temporary buffer memory locations as current added amounts for the stations stocked and into the current subtract amounts for the corresponding items for the central supply station or other station supplying the transferred products. Of course if the "Stock" command described pertains to stocking the central supply, there are no data entries for current subtract amounts pertaining to the central supply. The system will then return and allow the user to select another command, for example, the "Print" command.

Figure 9:
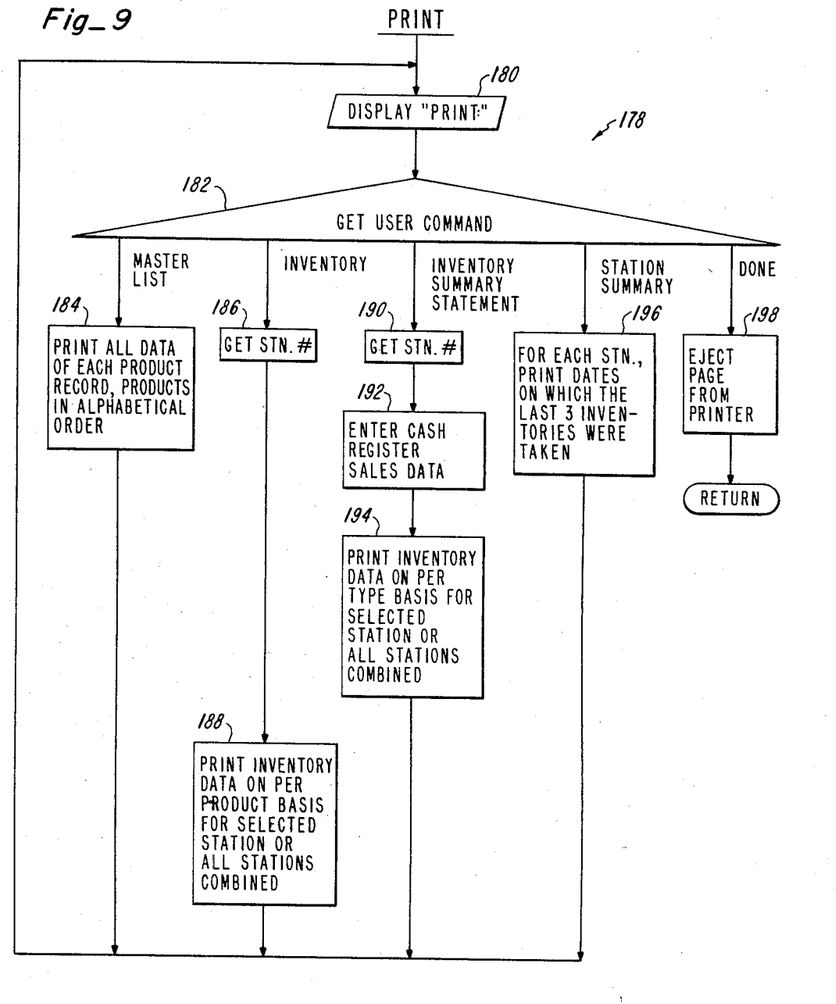
FIG. 9 is a flow diagram of the "Print" operation of the flow diagram shown in FIG. 4.

Selection of the "Print" command 178, shown in FIG. 4, results in execution of the operations for the "Print" command shown in FIG. 9. Initially the display presents the word "Print" as shown at 180. Thereafter the user may select at 182 one of four inventory report commands to obtain a particular type of inventory report. After sufficient inventory reports have been presented and printed, the user may select at 182 the done command.

Upon selection of a "Master List" command, the system will print all data pertinent to each product record and print it with the names of the products in a selected order as shown at 184. Thereafter the system will return to allow another inventory report command to be selected.

Upon selection of the inventory command, the user will thereafter enter the station number for which the "Inventory" inventory report is desired at 186. Thereafter the system will print the inventory data for that selected station, as shown at 188. The "Inventory" inventory reports are different for the central supply stations and the dispensing stations. In a central supply station "Inventory" inventory report, the information is presented on a per product basis to compare the amount used by the dispensing stations to the amount issued from the central supply. Over/short information is supplied with respect to each product, as well as the number of units of product added to stock, the previous stock inventory data and the current stock inventory data. In a dispensing station "Inventory" inventory report, information is presented on a per product basis including the previous stock inventory data, the number of units of product added, the current on-hand stock inventory data, the number of units of product used, the wholesale costs of the stock added and the current stock and the stock used, the calculated gross sales based on the quantities used and the product retail price, the calculated gross profits based on the quantities used and the profit or difference between the retail and wholesale prices, and a serving cost percentage which is the wholesale cost per serving divided by the retail price per serving. In addition, the inventory data on a per product basis for all dispensing stations can be combined into a single "Inventory" inventory report upon selection of a predetermined number at 186 indicating all stations are to be combined and summarized on a per product basis.

Upon selection of a "Inventory Summary Statement" command, inventory data is presented with respect to each particular type of product from a station, or as a combined summary from all of the stations. The number of the selected station is entered at 190, or the predetermined number used to designate the combined summary information for all stations is entered at 190. Thereafter, the actual sales totals from the cash register associated with the selected station, are entered at the keyboard at 192. The inventory data on a per product basis is thereafter printed for the selected station or for all stations combined, as shown at 194. The "Inventory Summary Statement" inventory report supplied at 196 generally presents the same information as has been described at 188, except on a per type basis. That information includes the amount and current cost of previous stock, the amount and wholesale cost of stock added, the amount and wholesale cost of current stock, the amount and wholesale cost of stock used, the calculated and actual (cash register) gross sales, the calculated gross profit, sales differential information which is the calculated gross sales less the actual gross sales, cost percentage information which is the wholesale cost of stock used divided by the calculated gross sales, actual cost percentage information which is the wholesale cost of stock used divided by the actual gross sales, cost percentage differential information which is the actual cost percentage less the cost percentage, type percentage of total sales which is the total amount of sales of each type divided by the calculated gross sales, and actual percentage of total sales which is the total calculated sales of each type divided by the total actual sales. This information is supplied at 198.

Upon selection of the "Station Summary" command, the dates when the last three inventories were taken at each particular station are printed out, along with information concerning the type of each station, as shown at 196. Having thus completed all the available inventory reports which are available, the user will select the "Done" command and the printed page from the printer will be ejected at 198. A return to the step in the flow chart at 178, shown in FIG. 4, will thereafter occur.

In establishments where wine is dispensed by the serving from containers, in the same manner that liquor is dispensed from bottles as described herein, the present invention will accommodate wine sales and inventories in the same manner as liquor sales and inventories have been described.

From the foregoing description, it can be seen that the apparatus and system of the present invention creates accurate, effective and efficient inventory data pertaining to all the products and product types and station activities within a particular establishment engaged in dispensing products. A wide variety of inventory reports are available to be used for effectively controlling the inventory or stock of products dispensed and in effectively managing such an establishment to a financially profitable condition.

The new and improved features of the present invention have been described with a certain degree of particularity in conjunction with the preferred embodiment. It should be understood, however, that the present disclosure has been made by way of preferred example and that changes in details may be made without departing from the scope of the invention defined by the following appended claims.

What is claimed is:

1. A system for taking inventory of and obtaining inventory reports on a plurality of different products which are dispensed in full containers and in predetermined quantities less than the full amount from the containers, each container including a code associated therewith which uniquely identifies the product contained within the coded container, said system comprising:

identifying means for identifying each particular product dispensed, including means for sensing the code of the coded container and for deriving a product identification signal related to the code sensed and the product identified thereby and the container from which the product is dispensed;

weighing means for separately weighing each container of each of the plurality of particular products and any product contained therein and for supplying a weight signal related to the weight of each container and any product contained therein;

information entering means for entering information including the number of full containers of each particular identified product and for supplying a number signal related to the number of full containers of the particular identified products entered;

computer means operatively connected to receive the product identification signal from said identifying means and the weight signal from said weighing means and the number signal from said information entering means, said computer means operatively responding upon receipt of a product identification signal to thereafter accept at least one of the weight signal or the number signal and to correlate the product identification signal with the weight and number signal for each particular container identified, said computer means including (a) data store memory means for containing product record information on each particular product identified and for containing previous and current inventory data on the quantity of each particular product previously on-hand and currently on-hand respectively, said product record information including the specific gravity of each particular product and the weight of each empty container for each particular product and the quantity of product contained within each full container; and (b) program memory means containing data for controlling said computer means to create at least one inventory report by utilizing the product identification, weight and number signals and the product record information and inventory data contained in said data store memory means; said computer means for operatively correlating the product identification signal with the corresponding product record information for each container identified and automatically calculating the quantity of each particular product in each full container identified by multiplying the quantity of product contained in each full container by the number of full containers represented by the number signal and automatically calculating the quantity of particular product contained within any less-than-full container which has been identified and weighed by subtracting the weight of the empty container from the weight represented by each weight signal and performing at least one mathematical operation on the result of such subtraction using a number related to the specific gravity of the particular product identified, said computer means further adding the quantities of particular product in all full and less-than-full containers to obtain a total quantity amount in creating a current inventory report, the inventory reports including information describing the quantity of each particular product at the time when the previous and current inventory data was obtained; and said computer means adapted to be connected to copy producing means, said copy producing means operatively producing perceptible copies of inventory reports created by said computer means.

2. A system as defined in claim 1 wherein:

the product record information also includes cost information pertaining to each particular product dispensed; and the inventory report also includes information on the cost of products used and the cost of products added between the times of obtaining the previous and current inventory data.

3. A system as defined in claim 2 wherein:

said data store memory means is also operative for containing product type information which categorizes each particular product dispensed into one of a predetermined plurality of different types of products, at least two different particular products being categorized by the product type information as one type of the predetermined plurality of types;

said program memory means also contains data for creating an inventory summary report by also utilizing the product type information contained within said data store memory means; and said computer means is selectively controllable by control signals entered and supplied by said information entering means to create one of the inventory report or an inventory summary report, wherein the information presented in the inventory report with respect to each particular product is presented summarily in the inventory summary report for all products of each predetermined type.

4. A system as defined in claim 3 wherein:

said information entering means is also operative for entering information including the amount of sales of products and for supplying sales signals related to the amount of sales of products entered;

said program memory means also contains data for controlling said computer means to create the inventory report and the inventory summary report by also utilizing the sales signals;

the inventory reports include information describing costs and sales of each particular product; and the inventory summary reports include information describing costs and sales of each product type.

5. A system as defined in claim 4 wherein products are dispensed and sold from at least one dispensing station and are stored at and supplied to the dispensing station from at least one other station, and in said system:

said data store memory means is operative for also containing item record information which specifies each particular product present at each station;

said program memory means also contains data for controlling said computer means to create the inventory reports and the inventory summary reports by also using the item record information; and said computer means is selectively controllable by control signals entered and supplied by said information entering means to create the inventory reports and the inventory summary reports particular to any selected station.

6. A system as defined in claim 5 wherein products are dispensed from a plurality of separate dispensing stations, and in said system:

the item record information is particular to each station; and at least some of the item record information particular to one station is different than the item record information particular to another station.

7. A system as defined in claim 6 wherein said data store memory means of said computer means includes nonvolatile memory.

8. A system as defined in claim 7 wherein:

the product dispensed is a beverage and at least one beverage dispensed is of a liquor type;

the containers from which the liquor is dispensed are glass bottles;

the code associated with each glass bottle is a bar code attached to the bottle;

said code sensing means of said identifying means comprises a wand bar code reader; and said weighing means comprises a weight cell upon which to weigh the glass bottles.

9. A system as defined in claim 8 incorporated within apparatus used for taking inventory and obtaining said reports, said apparatus including a carrying case for containing therein said system, said apparatus and carrying case being capable of direct carrying by a human being.

10. A system as defined in claim 1 wherein:

said information entering means is also operative for entering information including the amount of sales of products and for supplying sales signals related to the amount of sales of products entered;

said data store memory means is also operative for containing within the product record information of each particular product the cost of each particular product;

said program memory means also contains data for controlling said computer means to create the inventory report by also utilizing said sales signals; and the inventory report created by said computer means also contains information pertaining to the costs and sales of products used and added between the times of obtaining the previous and current inventory data.

11. A system as defined in claim 10 wherein:

said data store memory means is also operative for containing product type information which categorizes each particular product dispensed into one of a predetermined plurality of different types of products, at least two different particular products being categorized by the product type information as one type of the predetermined plurality of types;

said program memory means also contains data for creating an inventory summary report by also utilizing the product type information contained within said data store memory means; and said computer means is selectively controllable by control signals entered and supplied by said information entering means to create one of the inventory report or an inventory summary report, wherein the information presented in the inventory report with respect to each particular product is presented summarily in the inventory summary report for all products of each predetermined type.

12. A system as defined in claim 11 wherein products are dispensed and sold from a plurality of separate dispensing stations and are stored at and supplied to the dispensing stations from at least one other station, and in said system:

said data store memory means is operative for also containing item record information which specifies each particular product present at each station, the item record information is particular to each station and at least some of the item record information particular to one station is different than the item record information particular to another station;

said program memory means also contains data for controlling said computer means to create the inventory reports and the inventory summary reports by also using the item record information; and said computer means is selectively controllable by control signals entered and supplied by said information entering means to create the inventory reports and the inventory summary reports particular to any selected station.

13. A system as defined in claim 1 wherein:

said data store memory means is also operative for containing product type information which categorizes each particular product dispensed into one of a predetermined plurality of different types of products, at least two different particular products being categorized by the product type information as one type of the predetermined plurality of types;

said program memory means also contains data for creating the inventory report by also using the product type information contained within said data store memory means; and said computer means is selectively controllable by control signals entered and supplied by said information entering means to present information in the inventory report describing information for each product type.

14. A system as defined in claim 3, 4, 5, 6, 11, 12 or 13 wherein the product is a liquid, and the liquid product is dispensed from a container directly containing the liquid, the code associated with each container is attached to the container, and at least two types of product are different liquids and each different type of liquid has a different specific gravity.

15. A system as defined in claim 14 wherein the liquid is an alcoholic beverage.

16. A system as defined in claim 1 wherein products are dispensed and sold from a plurality of separate dispensing stations and are stored at and supplied to the dispensing stations from at least one other station, and in said system:

said data store memory means is operative for also containing item record information which specifies each particular product present at each station, the item record information is particular to each station and at least some of the item record information particular to one station is different than the item record information particular to another station;

said program memory means also contains data for controlling said computer means to create the inventory reports by also using the item record information; and said computer means is selectively controllable by control signals entered and supplied by said information entering means to create the inventory reports particular to any selected station.

17. A system as defined in claim 1, 2, 10 or 14 wherein the product is a liquid, and the liquid product is dispensed from a container directly containing the liquid, and the code associated with each container is attached to the container.

18. A system for obtaining inventory reports on a plurality of different liquor beverage products each of which is dispensed from an initially full container in a predetermined quantity less than the full amount of the container, each container including a code attached thereto which uniquely identifies the product contained within the coded container, said system comprising:

identifying means for identifying each particular product dispensed, including means for sensing the code attached to the container and for deriving a product identification signal related to the code sensed and the product identified thereby and the container from which the product is dispensed;

weighing means for separately weighing each container of each of the plurality of particular products dispensed and any product contained therein and for supplying a weight signal related to the weight of each container and any product contained therein;

computer means operatively connected to receive the product identification signal from the identifying means and to thereafter accept the weight signal from said weighing means and to correlate the product identification and weight signals, said computer means including (a) data store memory means for containing product record information on each particular product identified, said product record information including the specific gravity of each particular product and the weight of each empty container for each particular product; and (b) program memory means containing data for controlling said computer means to create an inventory report by utilizing the product identification and weight signals and the product record information in said data store memory means; said computer means operating correlating the product identification signal with the corresponding product identification record and automatically calculating the quantity of particular product contained within any less-than-full container which has been identified and weighed by subtracting from the weight represented by said weight signal the weight of the empty container and by dividing the result of said subtraction by the specific gravity of the particular product identified; and means connected to said computer means and operative for producing perceptable information describing the amount of product contained in each particular container identified and weighed.

19. A system as defined in claim 18 for also taking inventory of the plurality of products which are dispensed, said inventory including full containers of said particular products as well as the quantities of particular product remaining in the less-than-full containers, and wherein:

said system further includes information entering means for entering information, including the number of full containers of each particular identified product and for supplying a number signal related to the number of full containers of the particular identified products entered;

said computer means is operatively connected to additionally receive the number signal for each particular identified product and correlate the number signal with the product identification signal and the weight signal, the product record information contained in said data store memory means additionally includes the quantity of product contained within each full container, and said program memory means contains data for controlling said computer means to automatically calculate the quantity of each particular product in each full container identified by multiplying the quantity of each particular product in each full container identified by the number of full containers represented by the number signal to create the inventory report, the inventory report created including information describing the total quanity of each particular product on-hand.

* * * * *